US006785339B1

United States Patent
Tahernezhaadi et al.

(10) Patent No.: US 6,785,339 B1
(45) Date of Patent: Aug. 31, 2004

(54) METHOD AND APPARATUS FOR PROVIDING SPEECH QUALITY BASED PACKET ENHANCEMENT IN PACKET SWITCHED NETWORKS

(75) Inventors: Mansour Tahernezhaadi, Naperville, IL (US); J. Douglas Brophy, Arlington Heights, IL (US); Lee M. Proctor, Cary, IL (US); Michael J. Kirk, Mount Prospect, IL (US)

(73) Assignee: Motorola, Inc., Schaumburg, IL (US)

( * ) Notice: Subject to any disclaimer, the term of this patent is extended or adjusted under 35 U.S.C. 154(b) by 594 days.

(21) Appl. No.: 09/702,383

(22) Filed: Oct. 31, 2000

(51) Int. Cl.[7] ................................................ H04B 1/66
(52) U.S. Cl. ...................... 375/241; 375/249; 375/222; 375/221; 370/286; 370/287
(58) Field of Search ................................ 375/221, 241, 375/249, 219, 242, 222; 704/212, 221, 267, 233; 370/252, 286, 287, 289

(56) References Cited

U.S. PATENT DOCUMENTS

| | | |
|---|---|---|
| 5,903,862 A | 5/1999 | Weaver, Jr. et al. |
| 5,920,834 A * | 7/1999 | Sih et al. ................... 704/233 |
| 5,956,673 A | 9/1999 | Weaver, Jr. et al. |
| 6,138,022 A | 10/2000 | Strawczynski et al. |
| 6,370,120 B1 * | 4/2002 | Hardy ........................ 370/252 |

FOREIGN PATENT DOCUMENTS

| | | |
|---|---|---|
| WO | WO 96 19907 A | 6/1996 |
| WO | WO 00 54529 A | 9/2000 |

* cited by examiner

*Primary Examiner*—Phuong Phu
(74) *Attorney, Agent, or Firm*—Steven A. May

(57) ABSTRACT

An apparatus (200) checks voice quality when in a vocoder bypass mode. If the voice quality level is beyond an acceptable range, the apparatus (200) ends the vocoder bypass mode and returns to tandem vocoding. For example, a vocoder bypass controller (206) includes a speech quality detector (225) that determines the speech quality level of speech information based on at least one of detected volume level, echo level and noise level of the speech information. The vocoder bypass controller (206) with the speech quality detector (225) outputs a speech quality-based vocoder bypass control signal (236) to selectively activate or deactivate a vocoder bypass operation in response to the speech quality-based vocoder bypass control signal (236). In another embodiment, a network element for communicating speech packets includes an incoming decoder (512) and a speech quality detector (514) operative to determine the speech quality level of incoming speech packets. The speech quality detector (514) determines whether to activate speech quality enhancement operations in response to a determined speech quality level of incoming speech packets.

18 Claims, 6 Drawing Sheets

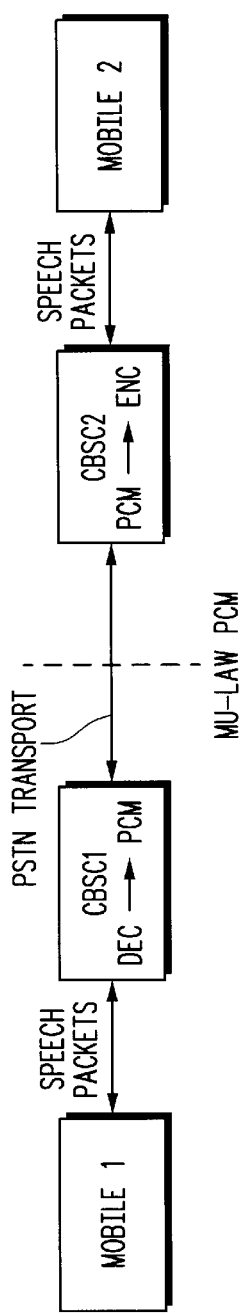
*FIG.1.1*
–PRIOR ART–
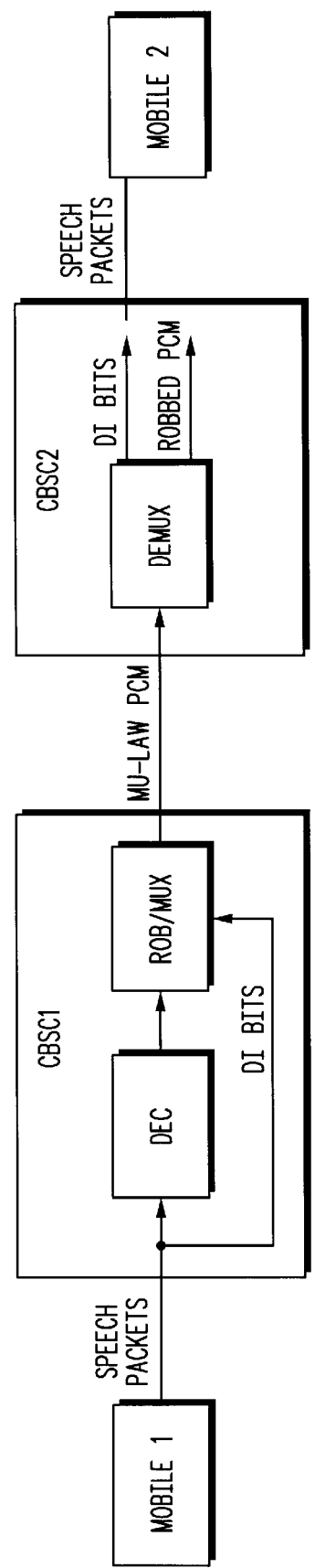
*FIG.1.2*
–PRIOR ART–

METHOD AND APPARATUS FOR PROVIDING SPEECH QUALITY BASED PACKET ENHANCEMENT IN PACKET SWITCHED NETWORKS

FIELD OF THE INVENTION

The invention relates generally to communication systems, and more particularly to communication systems that employ vocoders and information quality detection.

BACKGROUND OF THE INVENTION

Packet switched networks for transmission of voice signals and other information have gained tremendous impetus in recent years, wherein coded speech packets are routed through public (Internet voice over IP) or private networks (intranet) out to the destination point. With conventional systems, it is assumed that speech quality improvement such as acoustic echo cancellation, noise suppression and volume level adjustment has been addressed prior to encoding speech packets at the point of packet origination by an originating unit such as an Internet appliance, portable communication device, non- portable device, or any other suitable unit. However, failure of an originating unit to provide an adequate level of acoustic level of echo cancellation, noise suppression and volume level adjustment, leads to degraded speech (i.e. unintelligible information) quality at the receiving end unit.

As known in the art, speech samples are echo canceled (due to the presence of acoustic echo from, for example, a sending unit as received by a receiving unit) noise suppressed and level adjusted (automatic gain control) followed by encoding to produce speech packets for transmission to a destination unit. In an Internet protocol (IP) system, transmitted speech packets are routed to the receiving unit. An ISP gateway routes the packets through the Internet or intranet to an ISP gateway associated with a receiving unit where the speech packets are subsequently transmitted to an end user for decoding. Throughout this packet-based communication process it is assumed by the infrastructure (e.g., ISP gateway) that speech quality related issues, such as echo cancellation, noise suppression and volume level adjustment, have been adequately addressed at the point of origination by the sending unit.

However, a problem can arise if an inadequate level of echo cancellation is performed or if noise suppression is not completely performed by the sending unit. Accordingly, it would be desirable to provide independent speech quality assessment preferably by an immediate infrastructure unit (for example, an immediate ISP gateway) associated with the transmitting unit.

Moreover, in wireless communication systems that provide mobile unit to mobile unit communication, each mobile unit (originating unit) may provide echo cancellation, noise suppression and volume level adjustment. However, vocoders within the infrastructure between the two mobile units may also provide additional coding that may include additional echo cancellation, noise suppression and volume level adjustment during a call. This is sometimes referred to as tandem vocoder operation since the mobile units provide vocoding, but the infrastructure units associated with the wireless infrastructure, such as a cellular base site controller or any other suitable network element, also performs additional vocoding. This may occur for both an uplink and downlink communications.

For example, a sending mobile unit may encode speech packets which are then decoded by a wireless network element such as a centralized base site controller (e.g., CBSC or any other suitable network element), then communicated over a land line network to a wireless network element that is serving a destination mobile unit. The network element serving the destination mobile unit then encodes the information received from the land line network and transmits it to the destination mobile where it is then decoded. There is a loss in speech quality due to the tandem vocoding, i.e., the encoding and decoding that occurs by the mobile and wireless network element at the transmission side, respectively, and the re-encoding and decoding by the wireless mobile unit at the receiving side. Typically during vocoding operation, a reduction in bit rate occurs, resulting in a loss of quality. This occurs twice when going from mobile unit to mobile unit between a land line network.

Accordingly, it is known to provide vocoder bypass to improve voice quality that otherwise would be compromised by tandem vocoding required at the point of interface to a circuit switch network. For example, vocoder bypass technology may be used for mobile to mobile telephony to protect voice quality degradation due to tandem vocoding at the point of interface to a certain circuit-switched-based network such as a PSTN. For example, Telecommunication Industry Association (TIA), Working Group 4, IS634 describes an example of vocoder bypass operation to bypass vocoding by a network element.

Referring to FIG. 1.1, mobile user 1 has to perform echo cancellation, noise suppression and rate determination followed by speech encoding to transmit speech packets to its assigned centralized base site controller (CBSC). In the absence of vocoder bypass mode, since presently CBSCs are networked via PSTN circuit switch transport, speech packets from mobile user 1 are decoded at CBSC 1 to produce 64 kilobits per second in 8 bit MU/A-law PSTN transport format and are subsequently routed to mobile user 2's CBSC 2. At CBSC 2, the 8-bit MU/A-law speech samples are expanded into linear speech samples followed by echo cancellation, noise suppression, rate determination and encoded to produce speech packets for transmission to mobile user 2. This process is referred to as tandem vocoding which leads to degraded speech quality.

FIG. 1.2 illustrates a wireless communication network employing conventional vocoder bypass technology. As network elements, CBSC1 and/or CBSC2 employ vocoder bypass, the 16 kilobit per second rate adapted speech packets received by CBSC1 from mobile user 1 again are decoded into 64 bit per second 8 bit MU-law packets with two bits being robbed to insert rate-adapted 16 kilobit per second speech packets from mobile user 1, assuming communication from mobile user 1 to mobile user 2. Subsequently after going through the PSTN transport, at CSBC2, these two bits are extracted for transmission to mobile user 2. Thus, decoding and subsequent encoding of mobile user 1 speech packets have been bypassed at CBSC2 leading to superior speech quality compared to tandem vocoding. Using vocoder bypass, it is assumed at CBSC2 that transmitted speech packets from mobile user 1 are echo canceled, noise suppressed and volume level adjusted by mobile user 1. Hence, the CBSC2 does not monitor the speech quality of the packets. However, it has been observed that a significant number of mobile units may provide very poor acoustic echo cancellation. Thus, although vocoder bypass may improve speech quality over tandem vocoding, voice quality may suffer from the presence of uncanceled acoustic echoes. As a result, the inherent assumption with vocoder bypass mode that the underlying speech quality issues, such as echo cancellation, noise suppression and volume level adjustment, have been addressed by the transmitting mobile prior to the encoding process, may not be sufficient. Accordingly, conventional systems that employ vocoder bypass may still have echo compromised speech quality. As known in the art, echo cancellers are required to cancel echoes engendered either by a telephone network 2–4 hybrid (electrical echo) or by acoustic coupling of mouth and earpiece in a hands-free Internet appliance.

Accordingly, a need exists for independent speech quality assessment by or for a network element to improve system speech quality. In addition, it would be desirable to provide independent speech quality enhancement in systems that employ vocoder bypass or that have senders that perform echo cancellation or other speech quality enhancement.

BRIEF DESCRIPTION OF THE DRAWINGS

FIG. 1.1 is a block diagram illustrating conventional wireless communication between two mobile units without vocoder bypass;

FIG. 1.2 is a block diagram illustrating conventional vocoder bypass used between communication between mobile user 1 and mobile user 2;

DETAILED DESCRIPTION OF A PREFERRED EMBODIMENT OF THE INVENTION

Figure 2:
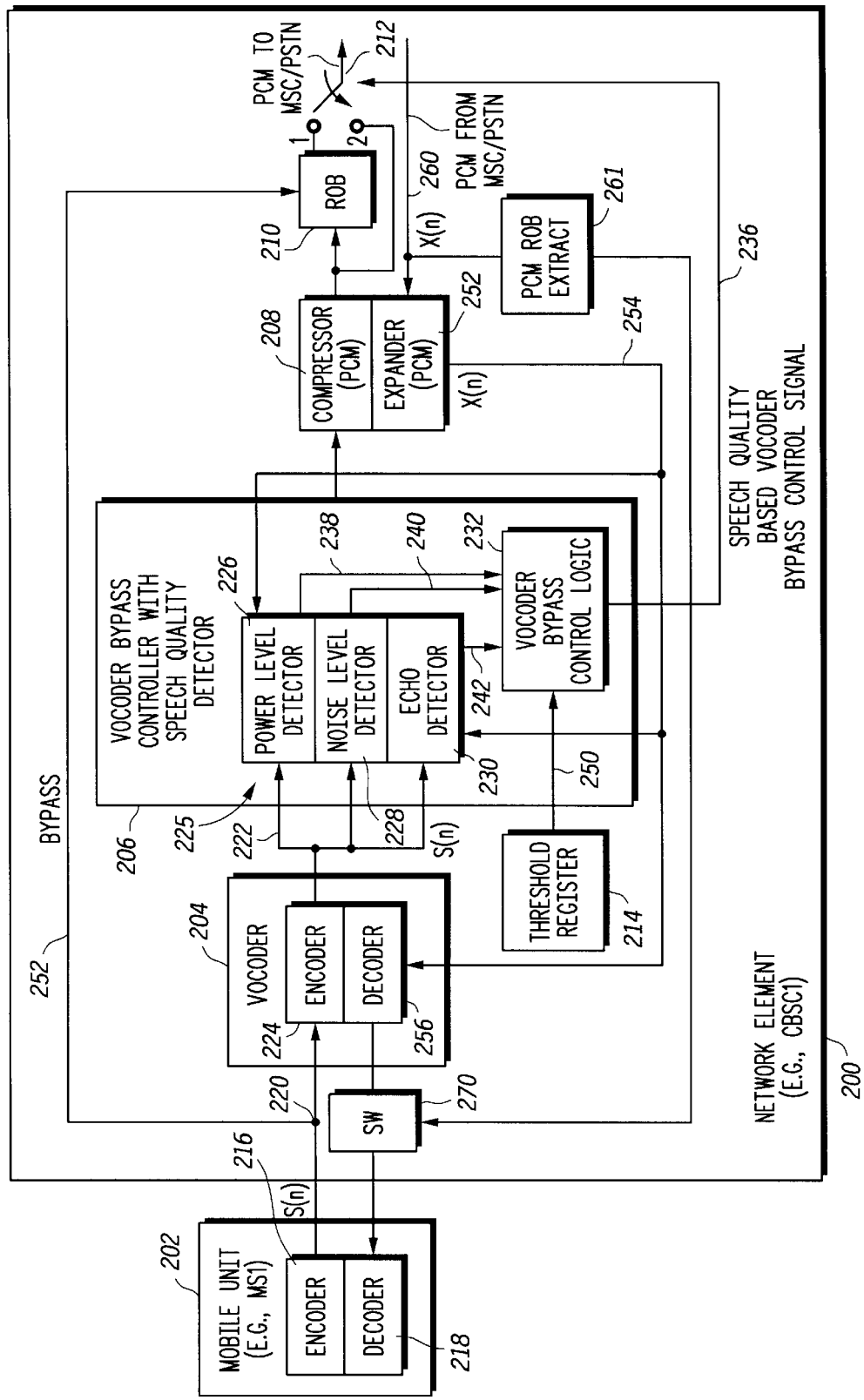
FIG. 2 is a functional block diagram illustrating one example of an apparatus, such as a network element or any other suitable apparatus, for providing vocoder bypass for speech information communicated between at least a first and second wireless communication unit in accordance with one embodiment of the invention.

Briefly, in one embodiment, an apparatus checks speech quality when in a vocoder bypass mode. If the voice quality level is beyond an acceptable range, the apparatus ends the vocoder bypass mode and returns to tandem vocoding. As used herein, vocoding can include the enhanced operation of providing speech quality enhancement at a network element level.

In one embodiment, a vocoder bypass controller includes a speech quality detector that determines the speech quality level of speech information based on at least one of detected volume level, echo level and noise level of the speech information. The vocoder bypass controller with the speech quality detector outputs a speech quality-based vocoder bypass control signal to selectively activate or deactivate a vocoder bypass operation in response to the speech quality-based vocoder bypass control signal. For example, if the detected speech quality level is below a desired threshold indicating that the speech quality is unsuitable, the apparatus will end the bypass mode operation and return to a tandem mode operation. Alternatively, if the apparatus is currently in a tandem mode, and if the speech quality level is higher than necessary, the apparatus may reenter into a bypass mode. The apparatus and method may be used to control vocoder bypass for uplink or downlink communications, i.e., a bi-directional implementation.

In another embodiment, an apparatus for communicating speech packets includes an outgoing decoder, having an input and an output, that is operative to provide speech packet quality evaluation and enhancement and to provide outgoing speech signals. The apparatus also includes an incoming decoder, having an input and an output, and a speech quality detector operatively coupled to the incoming decoder, operative to determine the speech quality level of incoming speech packets. The speech quality detector determines whether to activate speech packet quality enhancement in response to a determined speech quality level of incoming speech packets.

In this embodiment, the apparatus does not need to be used in a wireless communication system and does not require vocoder bypass operation, but utilizes the speech quality detector on an incoming decoder (or vocoder) wherein the apparatus includes both an incoming and outgoing decoder (or vocoders), to provide improved speech quality in a communication system to provide a type of independent speech quality detection and improvement irrespective of presence of speech enhancement algorithms (e.g., echo cancellation) provided by a sending unit, such as a computer, wireless Internet appliance or non-wireless device. In this embodiment, a method and apparatus determines that compressed speech packets contain undesirable audio artifacts (such as acoustic echo) and not near-end speaker information and replaces speech packets with alternative speech packets. Accordingly, on independent detection of undesired artifacts in the speech packet, the method and apparatus substitutes a new packet.

FIG. 2 illustrates a portion of a communication network that includes an apparatus, such as a network element 200, that provides vocoder bypass for speech information (i.e., any audible information) communicated between a first and second wireless communication unit. One wireless communication unit, mobile unit 202, is shown although a second wireless unit (not shown) is also engaged in the communication—see, e.g., FIG. 1.2). The invention will be described with respect to a reverse link mobile to mobile communication using a plurality of network elements such as centralized base site controllers in a cellular wireless communication network. However, it will be recognized that the invention equally applies to forward link communications, as well as in a bi-directional setting, and any suitable communication network. The network element 200 includes a vocoder 204, a vocoder bypass controller 206, a PCM compression and expansion stage 208, bit robber 210, and switch 212. The network element 200 also includes a threshold register (or registers) 214 that contain power level thresholds, noise level thresholds and echo level thresholds.

The vocoder 204, PCM compression and expansion stage 208 and bit robber 210 may be any suitable elements as known in the art. They may be implemented, as known, through one or more digital signal processors or any other suitable structure.

The vocoder bypass controller 206 with a speech quality detector 225 may also be implemented as a digital signal processor, microprocessor, microcomputer, discrete logic or any other suitable structure that may include but is not limited to, for example, software controlled processing devices that perform the functions as described herein.

The mobile unit 202 may be any suitable wireless communication unit that may include a vocoder with encoder 216 and a decoder 218 as known in the art. The disclosed apparatus and methods may be used for code division multiple access (CDMA)-based communication systems, or any other suitable communication systems.

The vocoder bypass controller 206 is operatively coupled to receive decoded speech information 222 generated or sent as encoded speech 220 S(n) by the mobile unit 202 that is encoded by encoder 216. Thus the received speech has already undergone one level of speech quality enhancement such as echo cancellation, noise suppression or volume level control by the mobile unit 202. The speech quality detector 225 is operatively coupled to receive decoded speech information 222 output from decoder 224. The decoded speech information 222 is made available to the vocoder bypass controller 206.

In one embodiment, the vocoder bypass controller 206 includes a power level detector 226, a noise level detector 228 and an echo detector 230. However, any of the detectors may be used alone or in other combinations. The vocoder bypass controller 206 also includes vocoder bypass control logic 232. As noted, these detectors and control logic may be implemented via software algorithms and executed by one or more processing units including DSPs, microprocessors or may be implemented in discrete logic or in any other suitable form. The vocoder bypass controller 206 includes the speech quality detector 225. The speech quality detector 225 includes the power level detector 226, the noise level detector 228 and the echo detector 230. The speech quality detector 225 is operatively coupled to receive the decoded speech information 222 from the vocoder 204 and determines the speech quality level of the received speech information and generates a speech quality-based vocoder bypass control signal 236 in response to the determined speech quality level. The vocoder bypass controller 225 selectively activates or deactivates the vocoder bypass operation through the control mechanism functionally shown as switch 212, in response to a determined speech quality level.

The vocoder bypass control logic 232 receives a detected power level 238, a detected noise level 240 and a detected echo level 242 and also receives corresponding programmed thresholds from the threshold register 214. The speech quality detector 225 determines speech quality based on at least one of a detected power level, a detected noise level and a detected echo level. The vocoder bypass control logic 232 compares the detected power level, noise level and echo level to the stored corresponding threshold levels. The threshold register 214 serves as a storage element containing a speech quality level threshold or a plurality of thresholds. For example, a speech quality level threshold for a desired power level may be stored, and another threshold level for an acceptable noise level may be stored, and an acceptable level of echo may be stored as a speech quality threshold. The speech quality detector 225, using vocoder bypass control logic 232, compares the determined speech quality level to the speech quality level threshold stored in the threshold register to determine whether to generate the speech quality-based vocoder bypass control signal 236.

For example, the vocoder bypass controller 206 determines, if during a vocoder bypass mode, there is an unsuitable amount of echo due to the detected echo being higher than an echo threshold. The speech quality level threshold 250 is compared with determined speech quality levels during a vocoder bypass mode. For example, as shown, during a vocoder bypass mode, the speech information 220 is bypassed as shown by bypass path 252 and passed directly to the bit robber stage 210 as known in the art. The switch 212 is switched to allow the pulse code modulated (PCM) information to be sent to a mobile switching center and to a PSTN or any other suitable communication network element. However, during a vocoder bypass mode, when the vocoder 204 is being bypassed, the vocoder bypass controller 206 still analyzes incoming speech packets when the vocoder is being bypassed to determine a speech quality level so that the network element may end vocoder bypass by switching switch 212 to position 2 so that the network element provides vocoding and, for example, enters back into a tandem mode with another (mate) network element. The mate network element, via vocoder bypass inband signaling as known in the art, determines if vocoding is being bypassed or tandemed given the position of switch 212. When in a vocoder bypass mode, the network element 200, in response to the determined speech quality, enters the vocoder tandem mode by switching switch 212 into position 2, if an unsuitable speech quality level is determined during a bypass of vocoding. The vocoder bypass controller 206 continues to dynamically determine a speech quality level of received speech packets even after a tandem vocoding mode is entered, such as when switch 212 is put in position 2, to determine whether a bypass mode can be entered again such as when a suitable quality level is detected. It will be recognized that the switch 212 is a functional switch and that the actual switching in and out of vocoder bypass mode includes the network control signaling to inform the other network element to also enter tandem vocoding or bypass a vocoder.

The vocoder 204, as known in the art, decodes speech packets, for example, into 64 code bit per second mu/a law packets with two bits being robbed to insert rate-adapted 16 kilobit per second speech packets from mobile unit 202. Although not shown, another network control element receives the encoded speech packets, which are subsequently extracted for transmission to a receiving unit such as another mobile unit. This is performed in the bypass mode. In the absence of vocoder bypass, since the network elements are networked via a PSTN circuit or other switched transport mechanism, speech packets from mobile unit 202 are decoded and passed through the vocoder bypass controller and compressed using a PCM compressor, as known in the art, and output to the PSTN. This occurs during tandem mode operation.

When receiving MU/a law PCM information to send to the mobile unit 202, a PCM rob bit extractor 261, extracts the robbed bit to determine whether to enter vocoder bypass and bypass the vocoder 204. If the vocoder 204 is to be bypassed, the PCM rob bit extractor 261 controls switch 270 to bypass the vocoder 204.

It will be recognized that for a forward link communication, the disclosed network element may perform speech packet enhancement without negotiating with a mate network element.

Figure 3:
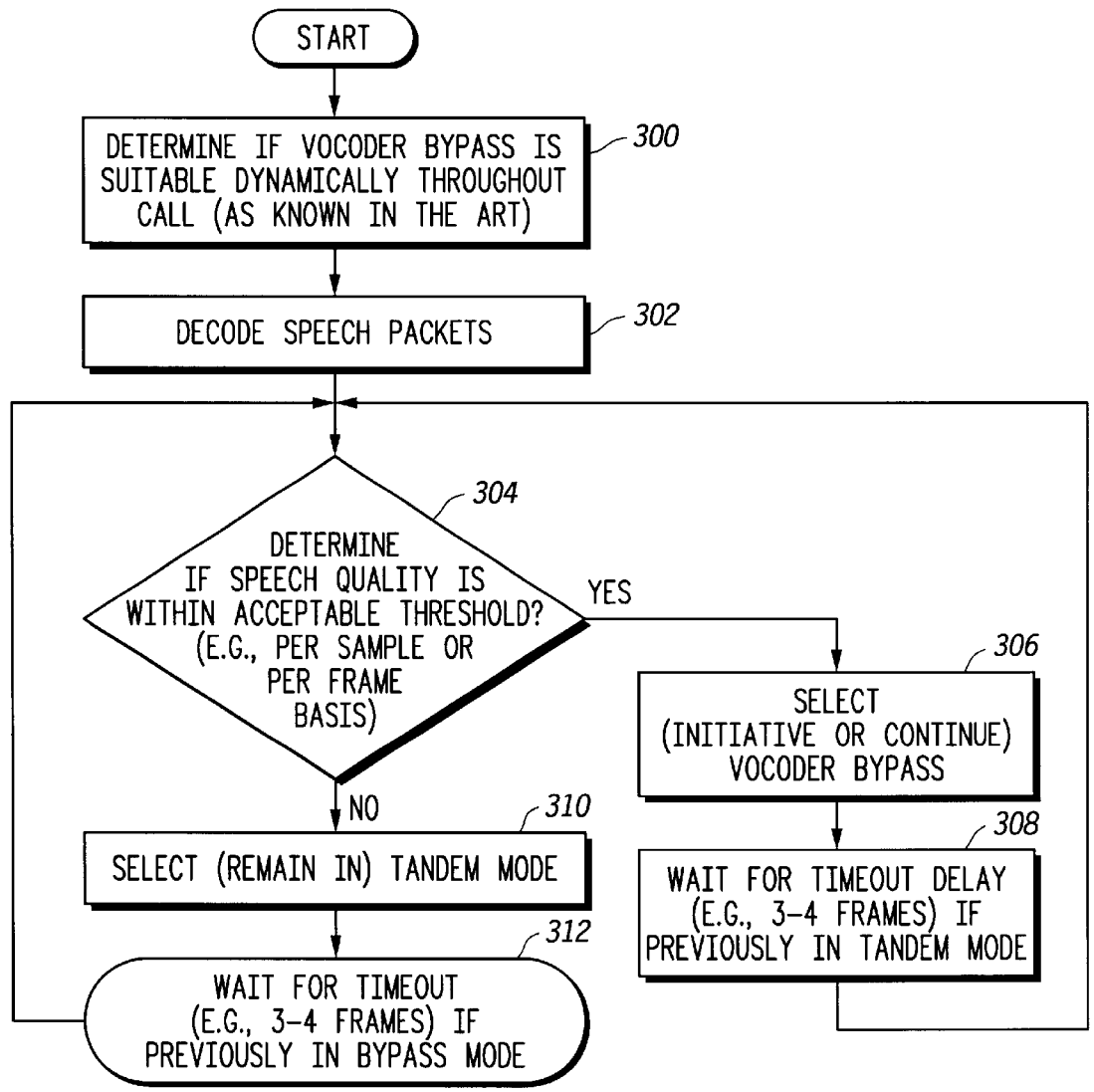
FIG. 3 is a flow chart illustrating one example of a method for controlling vocoder bypass in accordance with one embodiment of the invention.

FIG. 3 illustrates a method of operation of the network element 200 to provide a vocoder bypass control method. As shown in block 300, the method includes determining if vocoder bypass is suitable, for example, continuously and dynamically throughout the call. For example, in compliance with standard bypass mode determination procedures, the network element 200 and its associated mate network element (not shown) are controlled to enter in a bypass mode if, for example, a mobile unit to mobile unit communication is occurring. This may be carried out through suitable control signaling or any other suitable mechanism as known in the art. As shown in block 302, assuming that vocoder bypass is appropriate, the network element continues to decode speech packets through vocoder 204 and provide the decoded speech packets 222 to the vocoder bypass controller 206. The vocoder bypass controller 206 determines if the speech quality is within an acceptable threshold based on the speech quality threshold information 250 as shown in block 304. If the speech quality is within an acceptable threshold, such as if the power level is acceptable, the noise level is acceptable, or the echo level is acceptable, the method includes continuing to stay in the vocoder bypass mode as shown in block 306. If vocoder bypass mode is not currently employed, the method may include initiating vocoder bypass as shown in block 306 by informing the suitable network control element through a suitable control signal that vocoding bypass is desired for this particular call. The method continues as shown in block 308 where the network element may wait for a timeout, such as three to four frames, before evaluating additional frames, as to avoid unsuitably rapid transitions between bypass and tandem mode of operation as known in the art.

As shown in block 310, if it is determined that the speech quality level is not within an acceptable threshold, the method includes selecting a tandem mode of operation between a plurality of network elements. This may be done, for example, by the network element 200 informing a network controller or directly notifying, via vocoder bypass inband control signaling as known in the art, the mate network element associated with the receiving mobile unit to enter into a tandem mode. However, if the network element 200 is currently in a tandem mode, and the speech quality level is still below an acceptable level, the method includes remaining in the tandem mode. The process then continues as shown in block 312 to continue analyzing the speech quality level of incoming speech packets on a continuous basis, if desired.

Figure 4:
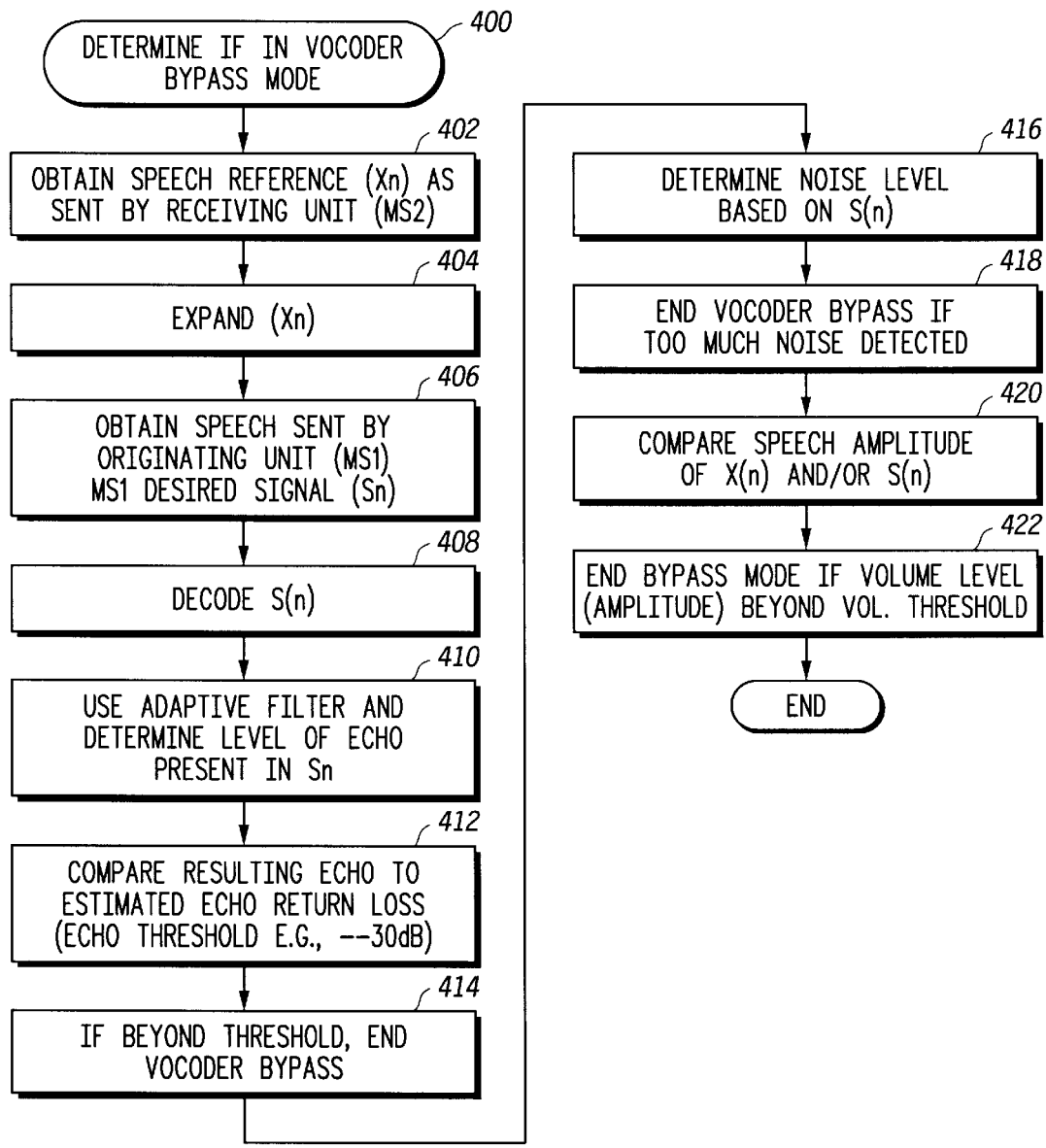
FIG. 4 is an example of a vocoder bypass control method in accordance with one embodiment of the invention.

FIG. 4 illustrates in more detail a method for vocoder bypass control to facilitate communication between a first and second wireless unit that are communicating through a plurality of network elements wherein the network elements can provide vocoding. As shown in block 400, the network element may determine if it is in a vocoder bypass mode for a mobile to mobile call, as known in the art. As shown in block 402, the method includes (for purposes of echo cancellation) obtaining the compressed speech (e.g., reference 260) (X(n)) (see FIG. 2) as sent by a receiving mobile unit. The received speech packets from the receiving mobile unit are then expanded in expander 252 and passed as expanded reference speech information 254 to the speech quality controller and vocoder 204. This is shown in block 404. Vocoder 204 encodes the information, namely, the expanded reference speech from the other mobile unit through encoder 256 and then passes it to mobile unit 202 which then decodes it through decoder 218 and then may provide suitable echo cancellation as known in the art.

As shown in block 406, the method includes obtaining speech sent by the originating unit, namely mobile unit 202 and the encoded speech packet 220 which is the desired signal. As shown in block 408, the vocoder decodes the desired signal, namely the encoded speech packets 220 and passes them to the vocoder bypass controller 206.

The vocoder bypass controller 206 uses the echo detector 230 which may be, for example, as known in the art an adaptive filter, to determine a level of echo present in the desired signal that is decoded, namely decoded signal 222. This is shown in block 410. The determined level of echo 242 is compared to a stored echo threshold in threshold register 214 which may be, for example, the estimated echo return loss as shown in block 412. If the determined level of echo 242 is beyond the stored echo threshold, as shown in block 414, the method includes ending vocoder bypass since the speech quality level is unsuitable. Accordingly, the method includes determining by the network element 200, the speech quality level of speech information communicated between the first and second wireless and selecting whether to enter bypass vocoding based on the determined speech quality level.

As shown in block 416, in addition, if desired, the vocoder bypass controller can determine the noise level of the decoded desire signal 222 using the noise level detector 228, as known in the art. A noise level detector algorithm primarily tracks the background noise energy of signal S(n) using common techniques as known in the art. As shown in block 418, the method includes ending vocoder bypass if too much noise is detected. For example, the noise level detector outputs the detected noise level 240 which is then compared to a stored acceptable noise level threshold in the threshold register 214. If the detected noise level is beyond the acceptable noise level, the vocoder bypass control logic will output a speech quality based vocoder bypass control signal 236 to switch out of the vocoder bypass mode and into a tandem mode. The mate network element involved in the call is also informed to switch to a tandem mode of operation via inband vocoder bypass control signaling.

As shown in block 420, another way of detecting a determined speech quality level is to evaluate the volume level of the received speech 250 and/or the volume level of the sent speech 222 as known in the art. This is performed by the power level detector 226 which outputs the detected power level 238. The detected amplitude or power level is then compared to a power level threshold obtained from the threshold register 214. Accordingly, several different power level thresholds may be employed such as one for speech coming from a sending unit or speech being received from a destination unit. If the power level of the compared speech information is beyond the acceptable thresholds, the method includes ending the vocoder bypass mode as shown in block 422 since the determined speech quality level is unsuitable. The process then continues for speech information received for a mobile to mobile communication during vocoder bypass and non-bypass modes of operation, if desired. Accordingly, if the network element is in a vocoder bypass mode during the mobile to mobile communication and an unsuitable speech quality level is detected, the method includes entering the vocoder tandem mode to improve the speech quality.

If network element 200 is operating in a forward link, the mate network element serving the receiving unit CBSC2 (that includes the vocoder bypass controller described herein) utilizes the expanded linear speech 220 samples obtained from robbed bit MU/a-law speech samples (desired signal S(n)) along with decoded linear speech samples 220 from the other mobile unit, namely the reference signal X(n). Thus, the mate network element is conducting voice quality detection on its robbed bit forward link signal. The reference signal X(n) and the robbed bit desired signal S(n) are fed into adaptive echo and noise and power level detectors, which may be implemented by suitable algorithms as known in the art. If the echo cancellation algorithm manages to converge to a stable and significant echo path and/or the presence of a high level of noise or poor audio noise is detected then the mate network element is instructed to stop vocoder bypass operation. For example, the robbing of MU/a law bits results in tandem vocoding is ensued in network CBSC2, or CSBC2 resumes tandem vocoding on its own using the robbed di-bits If adaptive echo cancellation fails to converge to a meaningful stable echo path or experiences reconvergence to a non-significant echo path or if there is a low noise level and inadequate power level, then vocoder bypass is resumed. The vocoder bypass control method and apparatus determines the speech quality level during a vocoder bypass mode (or a tandem mode if desired) and selects whether to enter bypass vocoding, stay in bypass vocoding, or revert to tandem mode based on the determined speech quality level. As a result, if a mobile unit's echo cancellation or speech quality level is worse than desired from a network standpoint, the method and apparatus uses tandem vocoding to improve speech quality level. Other advantages will be recognized by those of ordinary skill in the art.

Figure 5:
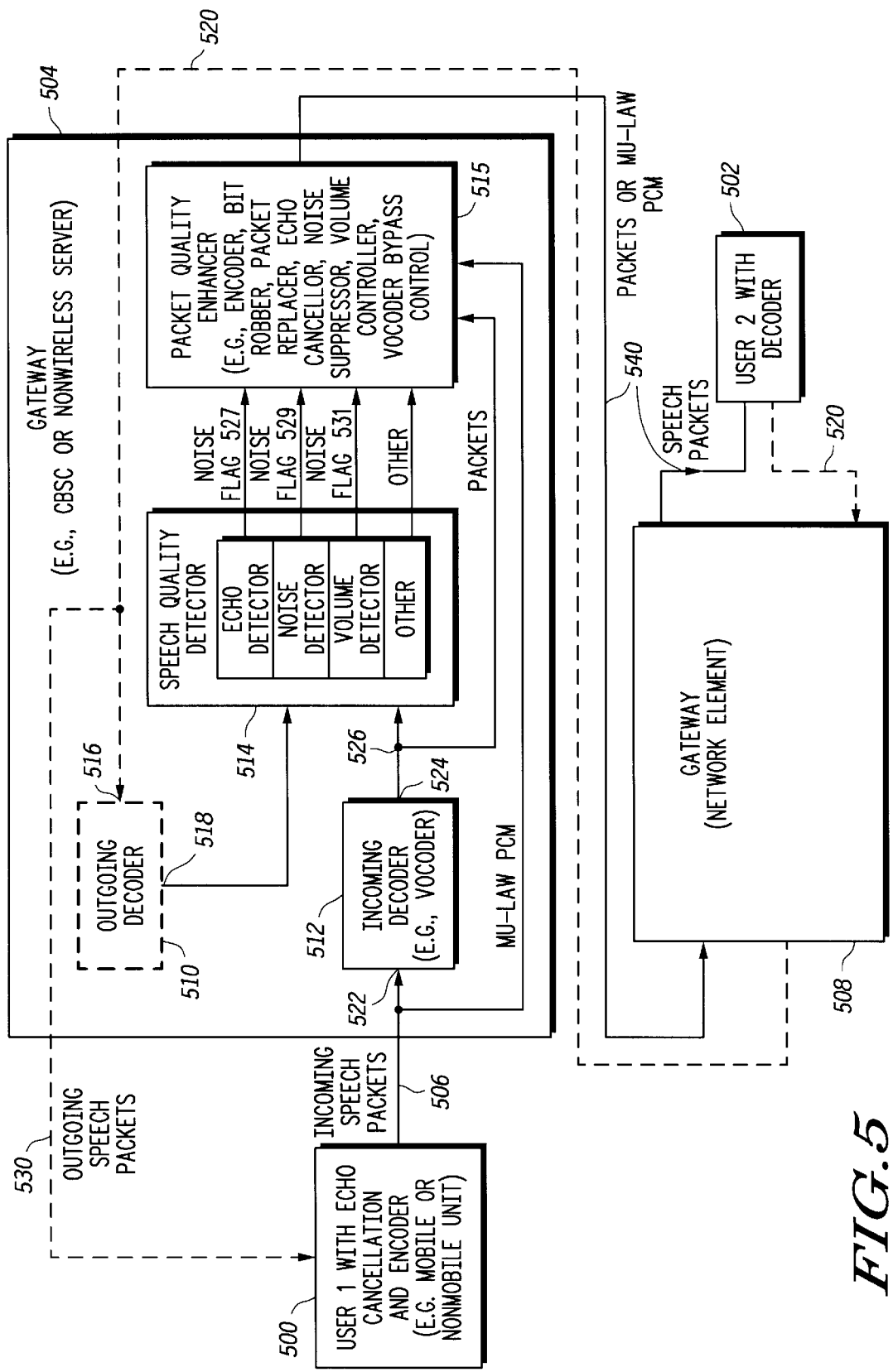
FIG. 5 is a functional block diagram illustrating one example of an apparatus with incoming speech quality detection in accordance with one embodiment of the invention.

FIG. 5 illustrates a communication system for communicating (e.g., routing) speech packets or other suitable information between a first user 500 and a second user 502. An apparatus 504, such as a wireless network element, a non-wireless network element such as a server or gateway, receives speech packets 506 from the first user 500 through any suitable wireless or non-wireless link. For purposes of discussion, and not limitation, the invention will be described with reference to a wireless network. However, it will be recognized that the invention may be equally applicable to non-wireless networks. A receiving gateway or network element 508 receives speech packets from the first network element 504 and passes the speech packets to the second user 502. The speech packet may or may not have previously undergone speech quality enhancement (e.g., echo cancellation, noise suppression, volume control or other enhancement) by the first user. The gateway 504 includes an outgoing decoder 510 (or vocoder), an incoming decoder 512 (or vocoder), a speech quality detector 514 and a packet quality enhancer 515. The outgoing decoder 510 has an input 516 and an output 518 that is operative to provide vocoding (e.g., decoding or enhanced decoding including speech quality detection and enhancement if desired) on outgoing speech packets that are received from user 502 as shown by dashed line 520. It will be recognized that the blocks are shown as functional blocks and that the speech quality detector 514, the outgoing decoder 510, the incoming decoder 512 and the packet quality enhancer 515 may be one or more suitably programmed processing devices, discrete logic, or any suitable combination of hardware, firmware and software.

The incoming decoder 512 has an input 522 and an output 524. The speech quality detector 514 may be the same type of speech quality detector such as that described with reference to FIG. 2. The speech quality detector 514 is operatively coupled to receive a decoded output signal 526 from the output of the incoming decoder 512 and determines the speech quality level of decoded speech packets from user 502 and determines whether to activate speech quality enhancement by the incoming decoder 512, or other packet quality enhancer 515, in response to a determined speech quality level of incoming speech packets. As shown, the speech quality detector 514 generates, by way of example, an echo flag 527 indicating that unsuitable echo was detected, a noise flag 529 indicating that unsuitable noise level was detected, volume level flag 531 indicating that an unsuitable volume level was detected, or other flags as desired for other speech quality parameters. The outgoing decoder 518 and the incoming decoder 512 may be the same circuits or algorithms that are used sequentially. Alternatively, separate decoders (or vocoders) may be used.

The packet quality enhancer 515 or if desired the decoders provide echo cancellation, volume level control, noise suppression, vocoder bypass as known in the art, in response to the flags. The first user 500 provides an echo canceled and encoded speech packet 506 to the gateway 504. The gateway 504 provides a speech quality evaluation on the encoded signals by decoding them through decoder 512 and passing them to the speech quality detector 514. If necessary, the packet quality enhancer 515 performs the requisite speech quality enhancement. Accordingly, the speech samples are echo canceled, noise suppressed and level adjusted (such as through automatic gain control) and subsequently encoded to produce speech packets for transmission to the user 502. The transmitted speech packets 506 are received by the gateway 504. The gateway 504 may be, for example, the ISP gateway or other suitable gateway. The gateway 504 routes packets through the Internet or intranet to ISP gateway 508 where it is subsequently transmitted to user 502 for decoding. As also shown, the outgoing speech packets are passed directly to the user 500. The network element 504, if desired, may perform bidirectional (evaluates outgoing and incoming speech packets) speech quality detection.

It will be recognized that although FIG. 5 shows speech quality enhancement to incoming packets, the network element (e.g., gateway) 504 may employ speech packet enhancement on outgoing packets as well using for example duplicate or shared processes. By way of illustration, the network element 504 may include a second speech quality detector operatively coupled to the incoming decoder and to receive outgoing packets, and operative to determine a speech quality level of outgoing speech packets. The second speech quality detector determines whether to activate speech quality enhancement for outgoing speech packets in response to a determined speech quality level of outgoing speech packets. The packet quality enhancer then performs the requisite quality enhancement on outgoing packets as required.

If desired, the receiving network element 508 may include the same elements as the network element 504 to facilitate additional speech quality detection and enhancement so that packets transferred to user 502 are similarly monitored and quality enhanced if necessary. Alternatively, the network element 508 may be a conventional gateway or router and not perform any speech packet quality enhancement.

Figure 6:
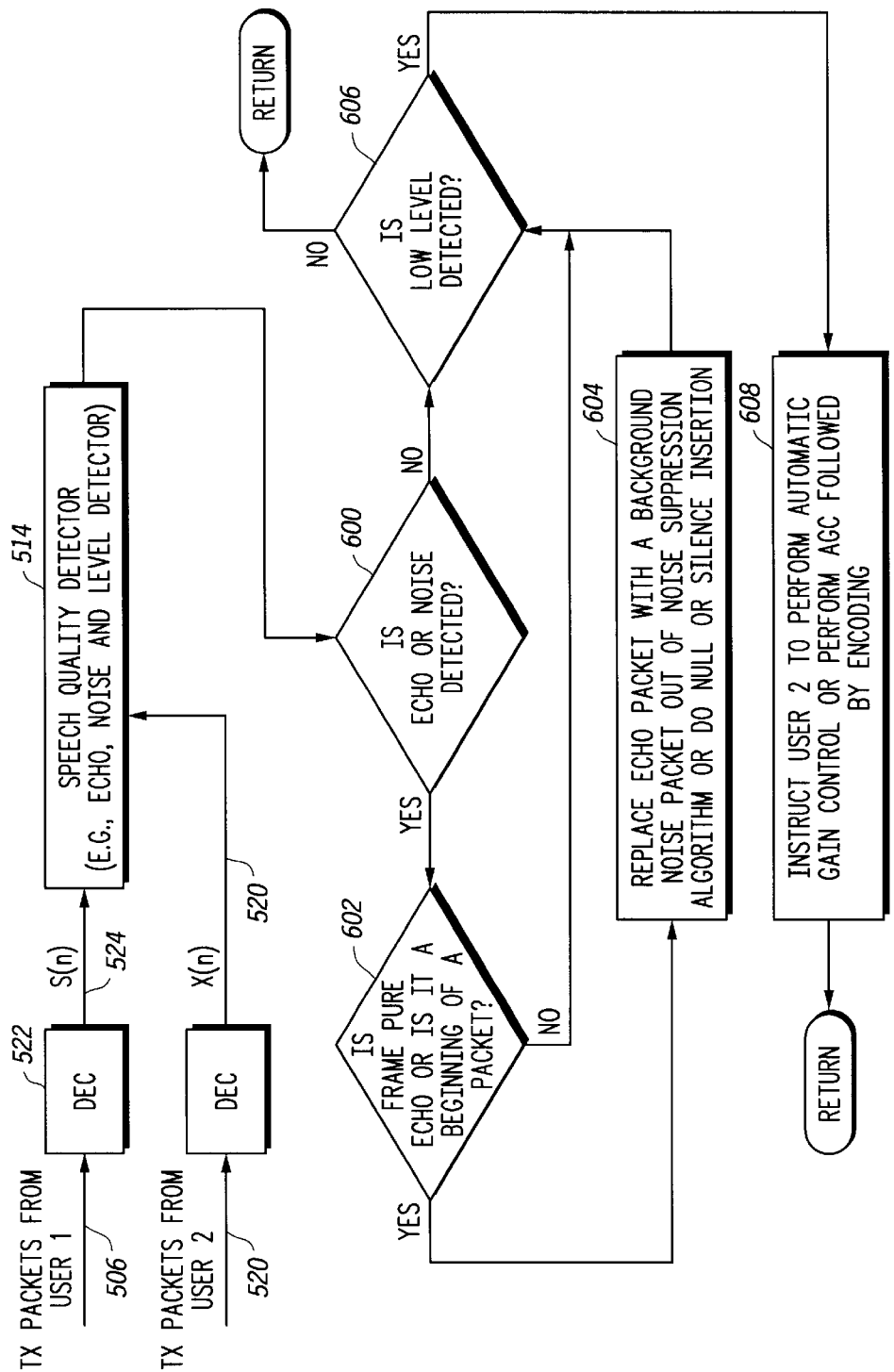
FIG. 6 is a combination flow chart and block diagram illustrating one example of an apparatus with incoming speech quality detection in accordance with one embodiment of the invention.

Referring to FIGS. 5 and 6, the network element (e.g., gateway) 504 performs speech decoding on received packets from both directions. The decoded speech samples are then fed into the adaptive speech quality detector 514 to check in parallel for the presence of echo, noise or poor audio level. As shown in block 600, if poor echo cancellation is detected, the echo cancellation flag 527 (FIG. 5) is set. The speech quality detector 514 then determines whether the present frame is a pure echo frame only, as shown in block 602. If so, then samples are taken of the noise suppression algorithm, which is running continuously. As shown in block 604, the samples are replaced and encoded as background noise-only frames, by the packet quality enhancer 515. It may be, for example, a ⅛ rate frame insertion when using, for example, EVRC, 13KQCELP and 8KQCELP. This is basically equivalent to replacing echo packets with background noise packets or silence only packets. The inserted packets are then sent to the destination unit. However, if sufficient echo is not detected, the packet is not echo canceled and is sent as is.

In addition, as also shown by blocks 600–604, if the noise level of decoded packets from a transmitting user is above the acceptable threshold, then those decoded packets with the suitable energy level close to the noise level will be replaced by background noise packets. The background noise samples are the output samples taken from the continuously running noise suppression algorithm. This is done in order to ensure a suitable spectrally matched noise level which would otherwise be objectionable from a subjective listening point of view. Subsequently, background noise samples out of the noise suppression algorithm are given to an encoder in order to generate background noise packets. For example, in the case of an EVRC encoder, the encoder is further instructed to generate the background noise packet at ⅛ rate. As applied to the vocoder bypass controller, the output of the vocoder bypass controller is the original input transmitted packets, if they are voice, but not echo packets, otherwise background noise packets are generated by a noise suppression algorithm/encoder if they are deemed echo or noise between utterance packets.

As to volume level detection, if the long term peak signal power of the transmitting user's decoded packet is significantly below either the long term peak power of the receiving user's decoded packets or a predetermined threshold level, as shown in block 606, the receiving user is instructed to increase its received audio level on its decoded packets accordingly as shown in block 608. Alternatively, the decoded speech packet can be volume adjusted as desired and subsequently encoded to produce a new packet for transmission. The process returns to evaluate a next speech packet.

As such, upon detection of echo even though the packets have already been echo canceled at the source, echo packets are replaced by background noise frame packets. The method may in some cases increase divergence between the end vocoders but the resultant possible speech degradation may be significantly less than the echo leak throughs that the invention addresses.

Accordingly, transmitted and received packets may be decoded and passed on to adaptive algorithms to check for the presence of echo, noise and low audio levels. If the adaptive echo cancellation converges to a stable and significant echo path, the gateway transmits the transmitting user's gateway replaces the current transmitted packets by background noise packets by the continuously running noise suppression algorithm followed by an encoder. The noise suppression algorithm can be accomplished per IS-127. If the presence of noise is detected, meaning, for example, that the coded speech noise exceeds a certain threshold, the current packet is determined to be a background noise packet and the current transmitting user's packet is replaced by a background noise packet out of the noise suppression/encoder algorithm. If the presence of a low audio level is detected the receiving user is instructed to apply additional gain to its decoded packets. The above gateway and packet replacement mechanism may be employed in the system with reference to FIG. 2. Alternatively, with respect to echo cancellation only, the apparatus can replace the echo packets with silence or null packets. Consequently, this leads to insertion of complete silence, as opposed to comfort noise, when replacing the echo packet.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A vocoder bypass control method to facilitate communication between at least a first and second wireless unit wherein each of the first and second wireless units are in operative communication with at least one network element that can provide vocoding comprising:

determining, by at least one network element, an echo level communicated between the first and second wireless units;

selecting whether to enter bypass or tandem vocoding by at least one network element based on the determined echo level;

obtaining pulse code modulated (PCM) compressed speech as sent by the first wireless unit and obtaining encoded speech as sent by the second wireless unit;

providing decompressed speech from the PCM compressed speech and decoded speech from the encoded speech; and performing echo canceling on the decompressed speech during a tandem vocoding mode of operation in response to a determined unsuitable echo level.

2. The method of claim 1 including the step of:
   if vocoding is being bypassed, ending vocoder bypass in response to a determined unsuitable echo level.

3. The method of claim 1 including the step of:
   in response to the determined echo level, entering a vocoder tandem mode if an unsuitable echo level is determined during a bypass of vocoding.

4. A vocoder bypass control method to facilitate communication between at least a first and second wireless unit wherein each of the first and second wireless units are in operative communication with at least one network element that can provide vocoding comprising:

determining, by at least one network element, an echo level communicated between the first and second wireless units;

selecting whether to enter bypass or tandem vocoding by at least one network element based on the determined echo level; and dynamically determining a echo even after a tandem vocoding mode of operation to see if a bypass mode can be entered again.

5. An apparatus for providing vocoder bypass for audio signal information communicated between at least a first and second wireless communication unit comprising:

a vocoder; and a vocoder bypass controller including:

an echo level detector operatively coupled to receive the speech information from the vocoder, and operative to determine an echo level of the received speech information and to generate an echo level based vocoder bypass control signal in response to de determined echo level; and vocoder bypass control logic operatively responsive to selectively activate or deactivate a vocoder bypass operation in response to the echo level based vocoder bypass control signal; and wherein the vocoder boss controller dynamically determines an echo level even after a tandem vocoding mode of operation to see if a bypass mode can be entered again.

6. The apparatus of claim 5 including a storage element containing an echo level threshold and wherein the echo level detector compares the determined echo level to the echo level threshold to determine whether to generate the echo level based vocoder bypass control signal.

7. The apparatus of claim 5 wherein the vocoder bypass controller determines if vocoding is being bypassed and ends vocoder bypass in response to a determined unsuitable echo level.

8. The apparatus of claim 5 wherein the vocoder bypass controller, in response to the determined echo level, enters a vocoder tandem mode if an unsuitable echo level is determined during a bypass of vocoding.

9. An apparatus for providing vocoder bypass for audio signal information communicated between at least a first and second wireless communication unit comprising:
   a vocoder; and
   a vocoder bypass controller including:
      an echo level detector operatively coupled to receive the speech information from the vocoder, and operative to determine an echo level of the received speech information and to generate an echo level based vocoder bypass control signal in response to the determined echo level; and
      vocoder bypass control logic operatively responsive to selectively activate or deactivate a vocoder bypass operation in response to the echo level based vocoder bass control signal; and
      wherein the vocoder bypass controller obtains compressed speech as sent by the first wireless unit and obtains encoded speech as sent by the second wireless unit wherein the compressed speech and encoded speech was coded through a tandem vocoding mode of operation by a plurality of network elements and performs echo canceling on the obtained compressed speech in response to a determined unsuitable echo level.

10. A network element for communicating encoded speech packets comprising:
    vocoder bypass control logic to selectively activate or deactivate a vocoder bypass operation state for the network element;
    an outgoing decoder having an input and an output, and operative to provide vocoding on outgoing speech packets;
    an incoming decoder having an input and an output;
    a speech quality detector operatively coupled to the incoming decoder and operative to determine a speech quality level of incoming encoded speech packets whereby the speech quality level is at least one of echo level or background noise level; and
    a speech quality enhancer operative, based on the determination of speech quality level and when the vocoder bypass operation is in an active state, to perform encoded speech packet replacement by replacing current transmitted packets with at least one of background noise packets resultant from a noise suppression process, null packets or silence packets.

11. The network element of claim 10 wherein the incoming decoder and the outgoing decoder are the same circuits used sequentially and wherein the incoming speech has already undergone speech quality enhancement.

12. The network element of claim 10 including a packet quality enhancer operative to provide at least one of echo cancellation, volume level control and noise suppression.

13. The network element of claim 10 including a vocoder bypass controller, operatively coupled to the speech quality detector and operative to generate a speech quality based vocoder bypass control signal in response to the determined speech quality level; and vocoder bypass control logic operative to selectively activate or deactivate a vocoder bypass operation in response to the speech quality based vocoder bypass control signal.

14. A network element for a communication system comprising:
    vocoder bypass control logic to selectively activate or deactivate a vocoder bypass operation state for the network element;
    an outgoing decoder operative to provide vocoding on outgoing encoded speech packets;
    an incoming decoder having an input and an output; and
    a first speech quality detector operatively coupled to the incoming decoder and operative to determine a first speech quality level of incoming encoded speech packets whereby the first speech quality level is at least one of echo level or background noise level;
    a second speech quality detector operatively coupled to the incoming decoder and to receive outgoing encoded speech packets, and operative to determine a second speech quality level of outgoing encoded speech packets whereby the second speech quality level is at least one of echo level or background noise level; and
    a speech quality enhancer operative, based on the determination of at least one of the first speech quality level and the second speech quality level and when the vocoder bypass operation is in an active state, to perform encoded speech packet replacement by replacing current transmitted packets with at least one of background noise packets resultant from a noise suppression process, null packets or silence packets.

15. A method for enhancing speech quality in a communication system comprising:
    transitioning to a vocoder bypass mode of operation;
    receiving an outgoing speech packet from a first communication unit;
    transmitting the outgoing speech packet to a second communication unit;
    receiving an incoming speech packet from the second communication unit;
    determining if the incoming speech packet contains an echo signal caused, at least in part, by the outgoing speech packet; and
    selecting whether to transmit the incoming encoded speech packet or a replacement encoded speech packet to the first communication unit based on the determination and while remaining in the vocoder bypass mode of operation.

16. The method of claim 15, wherein the replacement speech packet consists of one of a null packet, silence packet or a background noise packet.

17. The method of claim 15, wherein the replacement packet is encoded at a different rate than the incoming speech packet.

18. The method of claim 15, wherein the replacement packet is encoded at a rate of $1/8^{th}$.

* * * * *